(12) United States Patent
Hiji et al.

(10) Patent No.: US 8,220,939 B2
(45) Date of Patent: Jul. 17, 2012

(54) SCREEN DEVICE, IMAGE PROJECTION SYSTEM, AND IMAGE PROJECTION METHOD

(75) Inventors: Naoki Hiji, Kanagawa (JP); Takeo Kakinuma, Tokyo (JP); Chikara Manabe, Kanagawa (JP); Tadayoshi Ozaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 414 days.

(21) Appl. No.: 12/552,739

(22) Filed: Sep. 2, 2009

(65) Prior Publication Data

US 2010/0208217 A1   Aug. 19, 2010

(30) Foreign Application Priority Data

Feb. 13, 2009   (JP) ................. 2009-031244

(51) Int. Cl.
| | |
|---|---|
| G03B 21/28 | (2006.01) |
| A61B 6/00 | (2006.01) |
| G02F 1/1335 | (2006.01) |
| G02F 1/135 | (2006.01) |
| G02F 1/03 | (2006.01) |
| G02F 1/07 | (2006.01) |
| G02B 26/00 | (2006.01) |
| G02B 21/36 | (2006.01) |
| G03H 1/00 | (2006.01) |

(52) U.S. Cl. ............ 353/98; 353/122; 250/582; 349/33; 349/5; 349/25; 359/254; 359/295; 359/30; 359/363

(58) Field of Classification Search .................... 353/98, 353/122; 250/582; 349/33, 5, 25; 359/254, 359/295, 2, 30, 363, 462

See application file for complete search history.

(56) References Cited

U.S. PATENT DOCUMENTS

| | | | | |
|---|---|---|---|---|
| 3,001,447 | A | * | 9/1961 | Ploke ............................ 359/292 |
| 5,638,103 | A | * | 6/1997 | Obata et al. ................... 347/164 |
| 5,672,453 | A | * | 9/1997 | Obata et al. ..................... 430/50 |
| 5,712,066 | A | * | 1/1998 | Yoshinaga et al. .............. 430/20 |
| 5,731,116 | A | * | 3/1998 | Matsuo et al. ................... 430/56 |
| 6,813,061 | B2 | * | 11/2004 | Taguchi et al. ............... 359/291 |
| 2008/0239458 | A1 | * | 10/2008 | Sachs et al. ................... 359/294 |
| 2009/0159345 | A1 | * | 6/2009 | Kobayashi et al. ......... 178/18.09 |

FOREIGN PATENT DOCUMENTS

| JP | A-58-108522 | 6/1983 |
|---|---|---|
| JP | A-10-020295 | 1/1998 |
| JP | A-2007-011211 | 1/2007 |

* cited by examiner

Primary Examiner — Georgia Y Epps
Assistant Examiner — Magda Cruz
(74) Attorney, Agent, or Firm — Oliff & Berridge, PLC

(57) ABSTRACT

A screen device of the present invention has a light collecting element array including a plurality of light collecting elements that collect incident light from a projector and a back surface sheet. The back surface sheet includes a first electrode plate, a second electrode plate, a photoconductive layer disposed between the first electrode plate and the second electrode plate, and an image recording layer disposed between the first electrode plate and the photoconductive layer. At the back surface sheet, a light reflecting portion is formed at a light collecting region to which the light collected by the light collecting elements is irradiated, and a light absorbing portion is formed at a non-light collecting region to which the light collected by the light collecting elements is not irradiated.

15 Claims, 12 Drawing Sheets

SCREEN DEVICE, IMAGE PROJECTION SYSTEM, AND IMAGE PROJECTION METHOD

CROSS-REFERENCE TO RELATED APPLICATION

This application is based on and claims priority under 35 USC 119 from Japanese Patent Application No. 2009-031244 filed Feb. 13, 2009.

BACKGROUND

1. Technical Field

The present invention relates to a screen device, an image projection system, and an image projection method.

2. Related Art

Japanese Patent Application Laid-Open (JP-A) No. 58-108522 discloses arranging a surface, which is different from a convex lens surface that collects incident light, as a light reflecting surface, as well as subjecting a region of the light reflecting surface which is not used to reflect light to a blacking treatment, thereby configuring it to be a light absorbing surface, so that light which is incident from an oblique direction is absorbed by the light absorbing surface.

JP-A No. 10-20295 discloses an image recording apparatus that collects image light by a micro lens array and exposing a liquid crystal-polymer composite layer as a recording layer by the image light.

JP-A No. 2007-11211 discloses an image forming apparatus having a display/record medium to which an image is written by irradiated light for writing the image from a display surface side of the medium on which the image is written.

SUMMARY

The present invention provides a screen device, an image projection system, and an image projection method for displaying a projected image with a high contrast in a bright location even when the relative positions of a screen, a projector, and illumination are changed as compared with a case that a light reflecting portion and a light absorbing portion are fixed.

According to an aspect of the invention, a screen device has a light collecting element array including a plurality of light collecting elements that collect incident light from a projector; and a back surface sheet which includes: a first electrode plate on which the incident light from the projector is incident, a second electrode plate, a photoconductive layer disposed between the first electrode plate and the second electrode plate and having impedance characteristics that change according to the light intensity of the incident light from the projector, and an image recording layer disposed between the first electrode plate and the photoconductive layer and having a layer state that changes based on a voltage applied to the first and second electrode plates and also based on the impedance characteristics of the photoconductive layer, and that maintains the layer state even after the application of the voltage is stopped. A light reflecting portion is formed at a light collecting region to which the light collected by the light collecting elements is irradiated, and a light absorbing portion is formed at a non-light collecting region to which the light collected by the light collecting elements is not irradiated.

BRIEF DESCRIPTION OF THE DRAWINGS

Exemplary Embodiments of the present invention will be described in detail based on the following figures, wherein.

DETAILED DESCRIPTION

First Exemplary Embodiment

Figure 1:
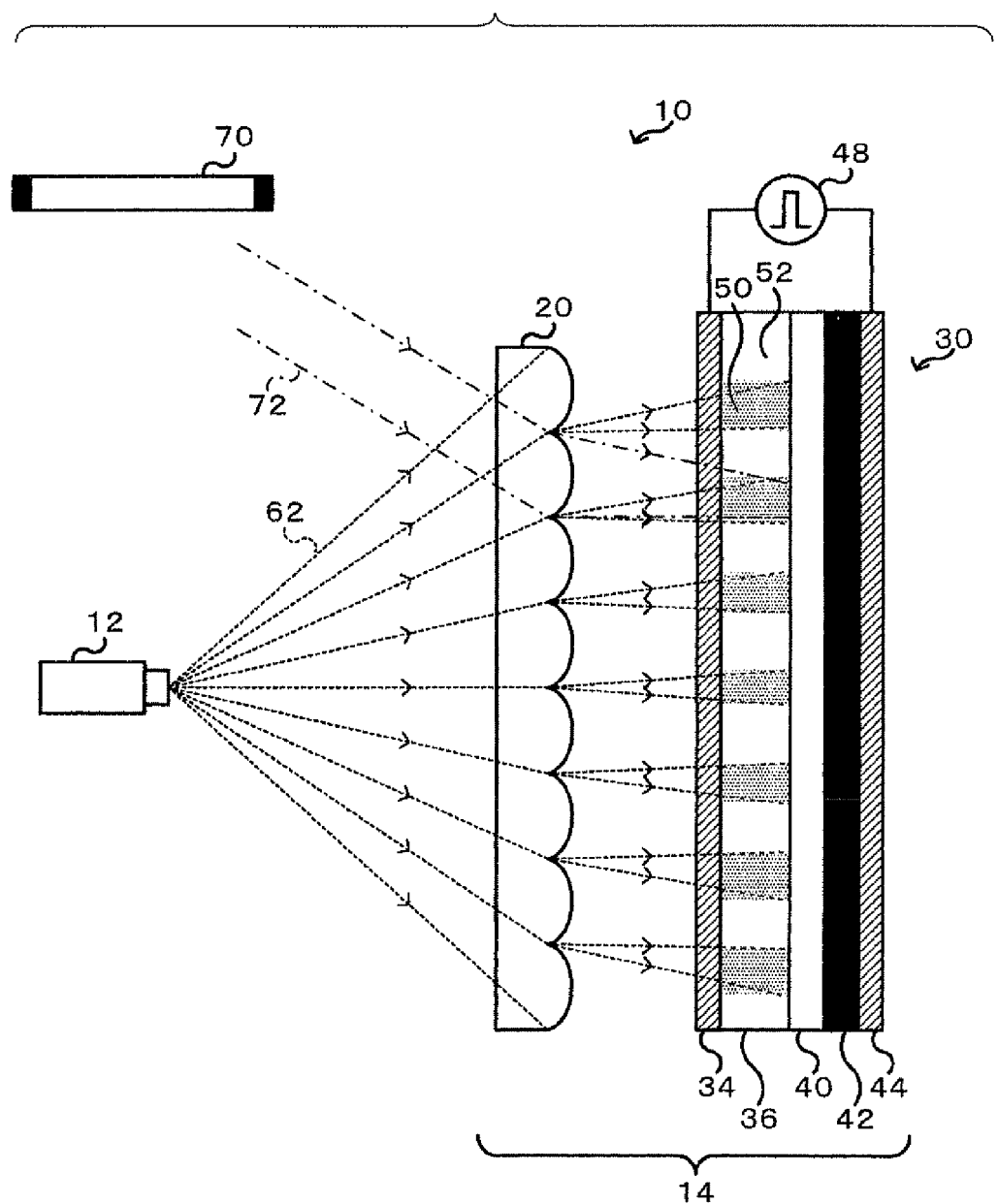
FIG. 1 is a schematic arrangement view showing an example of a schematic arrangement of an image projection system according to a first exemplary embodiment of the invention.

A first exemplary embodiment of the present invention will be explained below in detail referring to the drawings.

First, an outline of an overall image projection system of the exemplary embodiment will be explained. FIG. 1 shows a schematic arrangement of the overall image projection system of the first exemplary embodiment.

The image projection system 10 of the exemplary embodiment includes a projector 12 for projecting an image and a screen device 14 on which the projected image is displayed.

The projector 12 irradiates light (preparatory light) for forming a light absorbing portion and a light reflecting portion (the detail of which will be described later) and light (image light) for projecting an image onto a back surface sheet 30 of the screen device 14. A general-purpose projector 12 may be used as a specific example of the projector 12. The term "image" used in the exemplary embodiment includes both a still image and a moving image.

The screen device 14 includes a light collecting element array 20 and the back surface sheet 30. The back surface sheet 30 includes a transparent electrode 34, an image recording layer 36, a photoconductive layer 40, a light absorbing layer 42, a transparent electrode 44, and a power supply 48, (the detail of which will be described later).

The screen device 14 is used to display an image projected from the projector 12. The screen device 14 displays an image projected by projector light 62 as image light after the light absorbing portion 50 and the light reflecting portion 52 are formed on the image recording layer 36 of the back surface sheet 30 by projector light 62 as the preparatory light previously irradiated form the projector 12.

When an image is projected from the projector 12 onto the screen device 14, external light 72 irradiated from a lighting device 70 and the like is collected by the light collecting element array 20 and absorbed to the light absorbing portion 50 formed on the image recording layer 36 of the back surface sheet 30.

Next, the image projection system 10 of the first exemplary embodiment and an image projection method of the image projection system 10 will be explained in detail.

The screen device 14 of the first exemplary embodiment will be explained in detail.

Figure 2B:
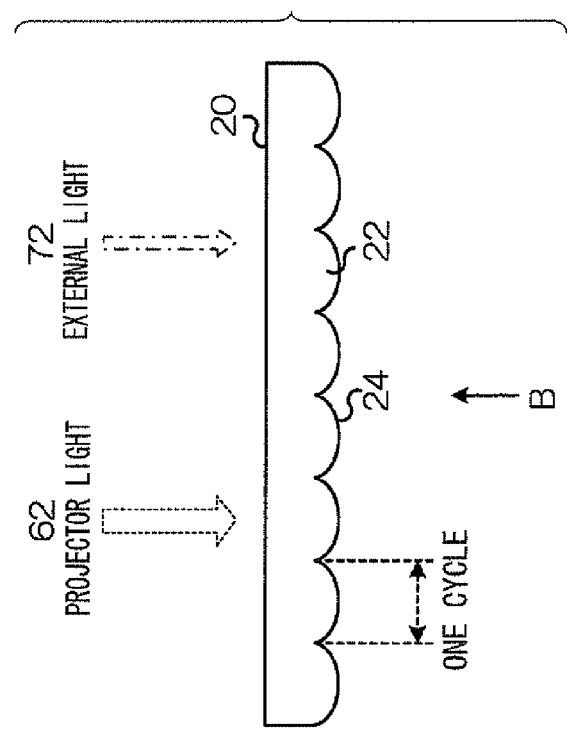
FIG. 2B is a schematic arrangement view showing an example of the schematic arrangement of the light collecting element array of the screen device according to the first exemplary embodiment of the invention.
Figure 2A:
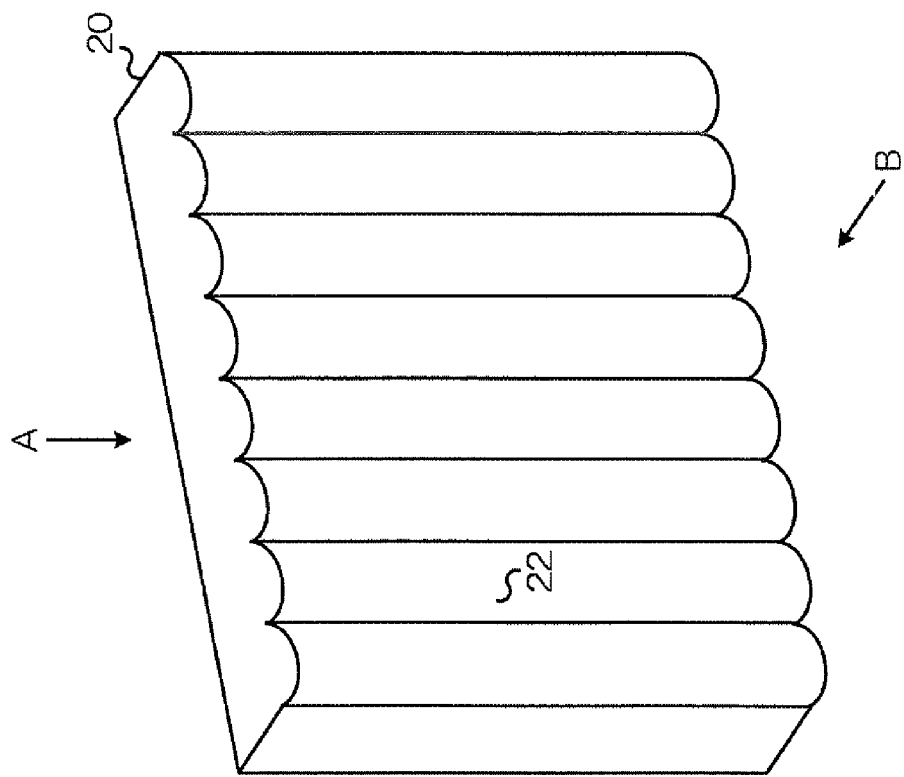
FIG. 2A is a schematic arrangement view showing an example of a schematic arrangement of a light collecting element array of a screen device according to the first exemplary embodiment of the invention.

FIGS. 2A and 2B show schematic arrangement views of an example of the light collecting element array 20 disposed to the screen device 14. As shown in FIG. 2A, the light collecting element array 20 of the first exemplary embodiment includes light collecting elements 22 as plano-convex cylindrical lenses. FIG. 2B shows a cross section of the light collecting element array 20 when it is viewed from an arrow A side shown in FIG. 2A. The projector light 62 projected from the projector 12 and the external light 72 irradiated from the lighting device 70 are incident from a plane side of the light collecting element array 20, collected on convex surfaces (light collection surfaces) 24 of light collecting elements 22, and irradiated onto the back surface sheet.

Since the degree of light collection (focal length) of the light collecting elements 22, the size of the light collecting elements 22, and the like are different depending on the pitch of pixels of the projector 12, the distance between the projector 12 and the screen device 14, and the like, they are determined in consideration an environment in which they are used. The size of the light collecting elements 22 is preferably set to 0.5 mm or less.

Figure 3:
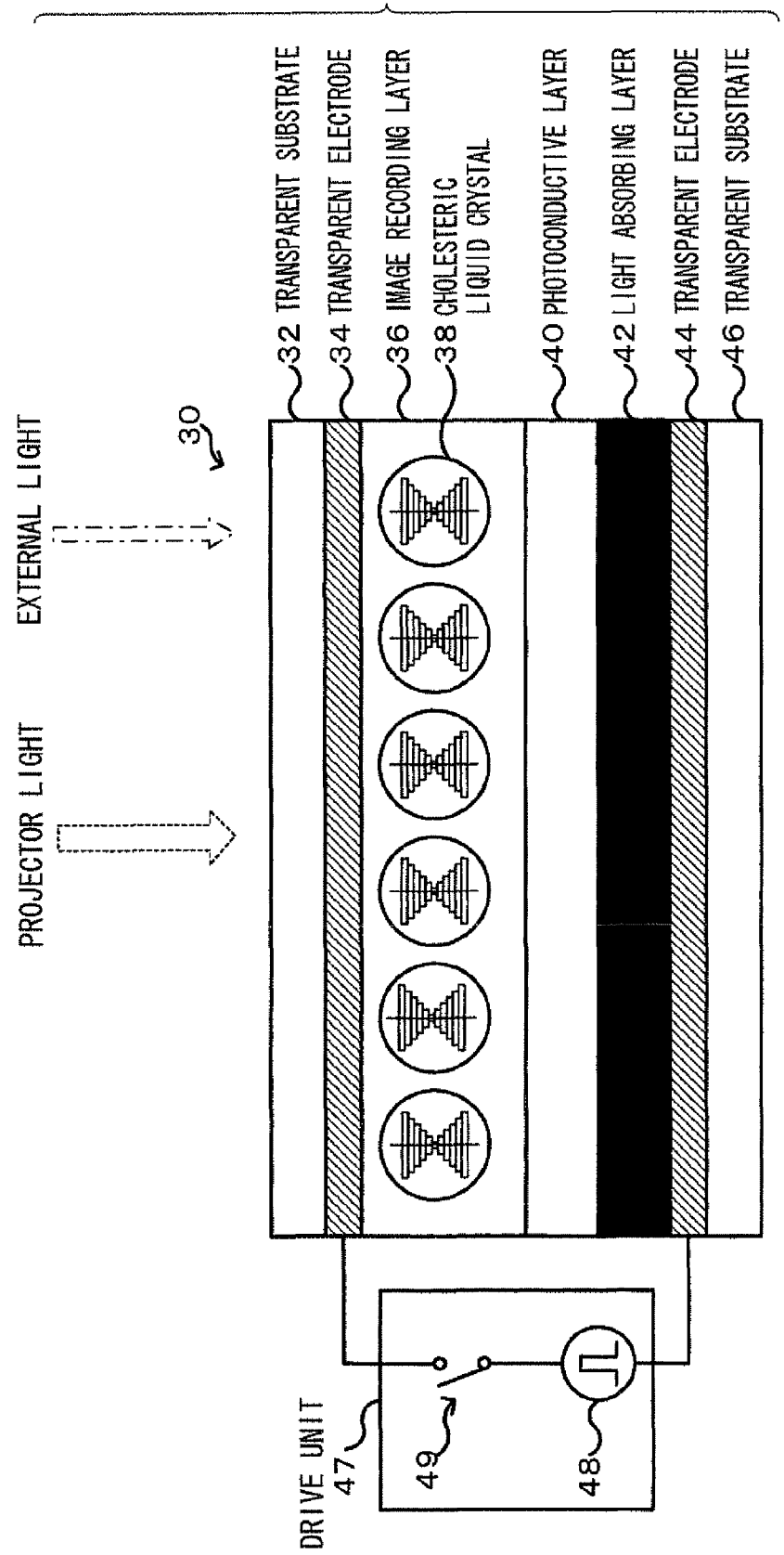
FIG. 3 is a schematic view showing an example of a schematic arrangement of a back surface sheet of the screen device according to the first exemplary embodiment of the invention.

The back surface sheet 30 disposed to the screen device 14 of the first exemplary embodiment will be explained in detail. A specific example of the back surface sheet 30 includes a so-called electronic paper. In the first exemplary embodiment, a case that the back surface sheet 30 includes the electronic paper will be explained as a specific example. FIG. 3 shows a schematic arrangement view of an example of a schematic arrangement of the back surface sheet 30 of the first exemplary embodiment. In the first exemplary embodiment, the back surface sheet 30 includes of a transparent substrate 32, the transparent electrode 34, the image recording layer 36, the photoconductive layer 40, the light absorbing layer 42, the transparent electrode 44, a transparent substrate 46, and a drive unit 47. The transparent substrate 32, the transparent electrode 34, the image recording layer 36, the photoconductive layer 40, the light absorbing layer 42, the transparent electrode 44, and the transparent substrate 46 are sequentially laminated from a side confronting the light collecting element arrays 20.

The transparent substrates 32, 46 are used to hold the respective function layers therebetween and to keep the structure of the back surface sheet 30. The transparent substrates 32, 46 are composed of a sheet-like member having strength withstanding external force. The transparent substrate 32 on the side confronting the light collecting element arrays 20 causes the projector light 62 and the external light 72 collected by the light collecting element arrays 20 to pass therethrough. The transparent substrates 32, 46 preferably have flexibility. Specific examples of materials of the transparent substrates 32, 46 include an inorganic sheet (glass-silicon and the like as a specific example), and a polymer film (polyethylene terephthalate, polysulfone, polyether sulfone, polycarbonate, polyethylene naphthalate, and the like as specific examples). A known functional film such as an antifouling film, an antiwear film, or a gas barrier film, may be formed on external surfaces of the transparent substrates 32, 46.

The transparent electrodes 34, 44 are used to apply a voltage applied from the power supply 48 to the respective function layers of the back surface sheet 30. The transparent electrodes 34, 44 have electric conductivity which is uniform on the surfaces thereof. The transparent electrode 34 on the side confronting the light collecting element arrays 20 causes the projector light 62 and the external light 72 collected by the light collecting element arrays 20 to pass therethrough. Specifically, a conductive thin, which is formed of metal (gold, aluminum, and the like as specific examples), metal oxide (indium oxide, tin oxide, indium tin oxide (ITO) as specific examples), conductive organic polymer (polythiophene polymer, polyaniline polymer, and the like as specific examples), and the like, is exemplified as the transparent electrodes 34, 44. A known functional film such as an intimate contact force improving film, or a gas barrier film may be formed on front surfaces of the transparent electrodes 34, 44.

The image recording layer 36 has a function of modulating the reflection state and/or transmittance state of light having a specific color in incident light by a voltage applied from the power supply 48 and a property for keeping a selected state even after the application of the voltage is stopped. The image recording layer 36 preferably has a structure which is not deformed by external force such as bending, or pressure.

In the first exemplary embodiment, the image recording layer 36 includes a liquid crystal layer of a self-holding type liquid crystal composite body including a cholesteric liquid crystal 38 and a transparent resin as an example. More specifically, although the liquid crystal layer does not necessarily require a spacer and the like so that it has a self-holding property as the composite body, it is not limited thereto. In the first exemplary embodiment, the cholesteric liquid crystal 38 is dispersed in a polymer matrix (transparent resin (not shown)) as shown in FIG. 3.

The cholesteric liquid crystal 38 has a function of modulating the reflection state and/or transmittance state of the light having the specific color in the incident light. Liquid crystal molecules at the cholesteric liquid crystal 38 are oriented in a helical, and interfere with and reflect specific light of the light incident in substantially the direction of the helical axis, according to the pitch of the helical. The orientation may be changed by applying a voltage (an electric field) to change a state of reflection.

Here, the cholesteric liquid crystal (chiral nematic liquid crystal) 38 will be explained in detail with reference to FIGS. 4A, 4B, and 4C. When the cholesteric liquid crystal 38 exhibits a planar phase, light incident substantially in parallel with the helical axis is separated into light with a right-handed rotation and light with a left-handed rotation, and a selective reduction of reflection is caused such that a circular polarization component of the light that coincides with the handedness of the helix is Bragg-reflected, and any remaining light is transmitted. The light reflected by the cholesteric liquid crystal 38 in the planar phase may exhibit colors from vivid colors to white according to the helical pitch, by appropriately operating the polymer matrix.

Figure 4A:
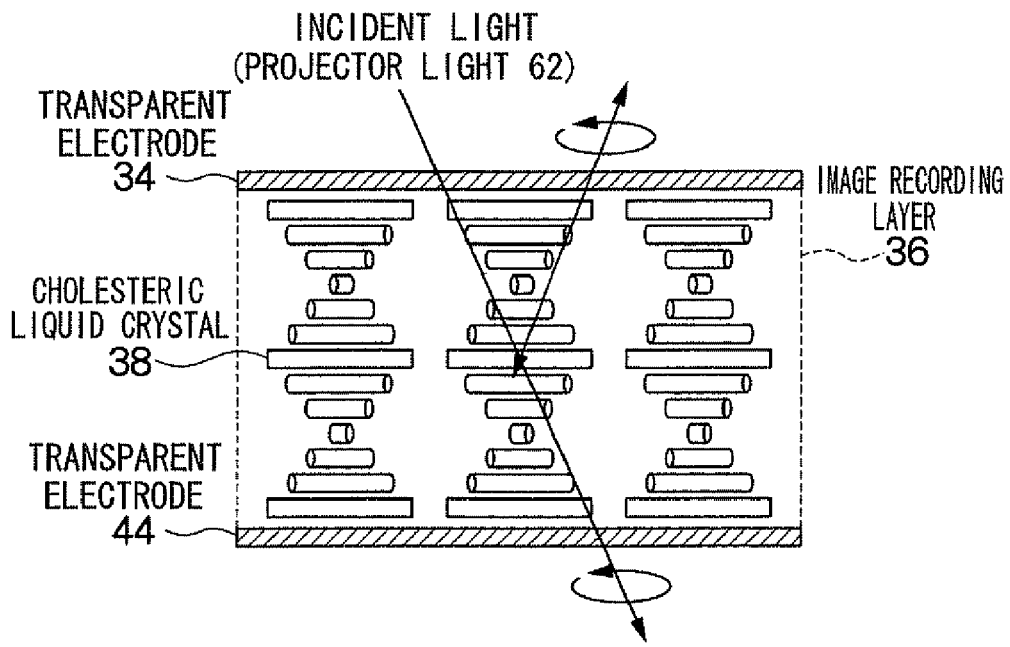
FIG. 4A is a schematic explanatory view explaining a relation between a molecular orientation and optical characteristics of a cholesteric liquid crystal of an image recording layer according to the first exemplary embodiment of the invention, in which the cholesteric liquid crystal has a planar phase.
Figure 4B:
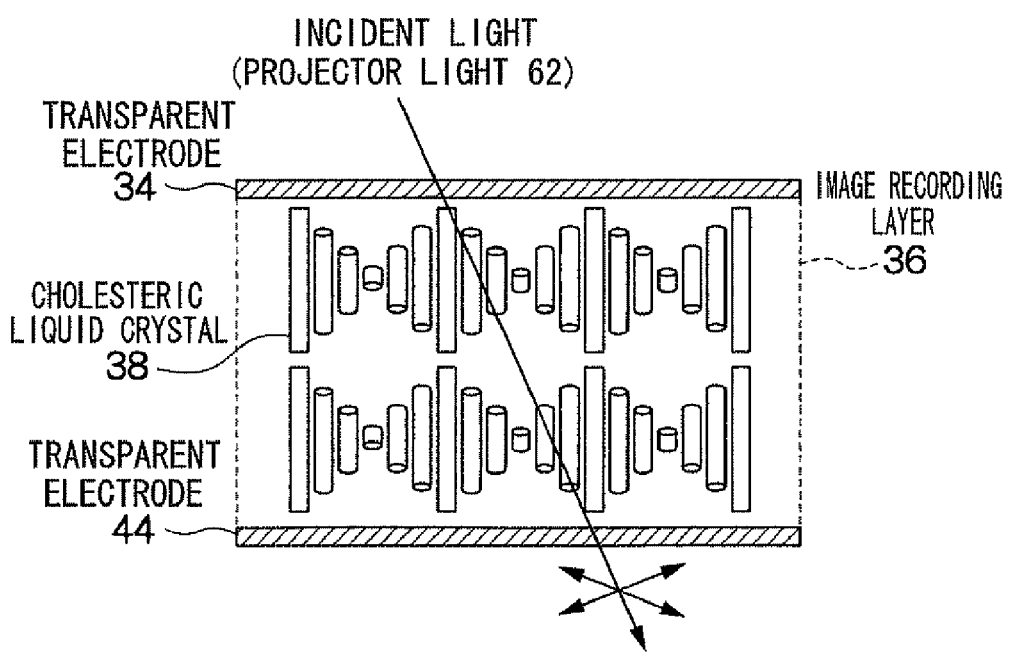
FIG. 4B is a schematic explanatory view explaining a relation between the molecular orientation and the optical characteristics of the cholesteric liquid crystal of the image recording layer according to the first exemplary embodiment of the invention, in which the cholesteric liquid crystal has a focal conic phase.
Figure 4C:
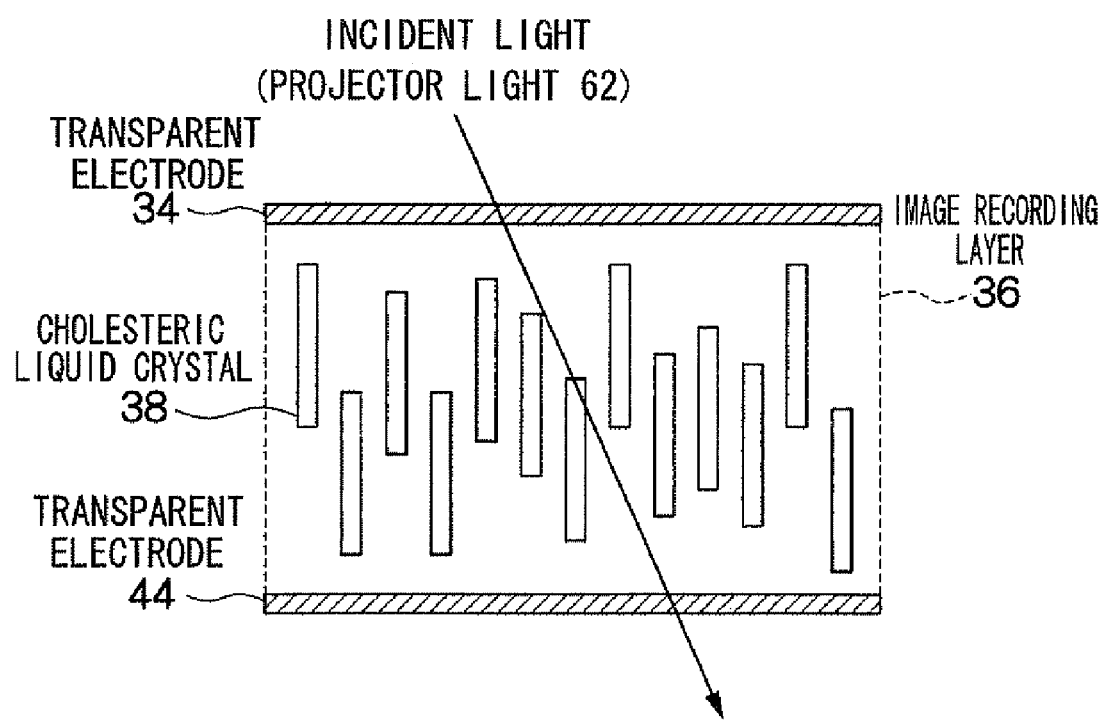
FIG. 4C is a schematic explanatory view explaining a relation between the molecular orientation and the optical characteristics of the cholesteric liquid crystal of the image recording layer according to the first exemplary embodiment of the invention, in which the cholesteric liquid crystal has a homeotropic phase.

The cholesteric liquid crystal 38 having positive dielectric anisotropy exhibits three phases, i.e., a planar phase in which the helical axis is substantially vertical with respect to a cell surface and selective reflection of incident light occurs, as shown in FIG. 4A, a focal conic phase in which the helical axis becomes approximately parallel with the cell surface and incident light is transmitted with a slight degree of forward scattering, as shown in FIG. 4B, and a homeotropic phase in which a helical structure is broken up, a liquid crystal director faces the direction of an electric field, and incident light is substantially completely transmitted, as shown in FIG. 4C.

The planar phase and the focal conic phase in the three phase states exist bi-stably in a field-free state. Accordingly, the phase state of the cholesteric liquid crystal 38 is not unambiguously determined to an electric field strength applied to the liquid crystal layer. That is, when the planar phase is in an initial state, it sequentially changes to the focal conic phase and the homeotropic phase as the electric field strength increases. In contrast, when the electric field strength applied to the liquid crystal layer is abruptly reduced to zero, the planar phase and the focal conic phase keep their phases as they are, and the homeotropic phase changes to the planar phase.

In the back surface sheet 30 using the cholesteric liquid crystal 38, the light reflecting portion 52 is formed according to a light collecting region 53 to which the light obtained by collecting the projector light 62 as the preparatory light by the light collecting element arrays 20 is irradiated, and the light absorbing portion 50 is formed according to a non-light collecting region 51. The light reflecting portion 52 and the light absorbing portion 50 are formed by the bistability of the cholesteric liquid crystal 38 (the detail of which will be described later).

In the first exemplary embodiment, an execution voltage applied to the transparent electrodes 34, 44 is controlled depending on whether or not the projector light 62 is irradiated, that is, whether the non-light collecting region 51 is used or the light collecting region 53 is used. When the planar phase state (P-state) or the homeotropic phase state (H-state) is set as an initial state, the cholesteric liquid crystal 38 changes to the P-state, the focal conic phase state (F-state), and the H-state, and when the F-state is set as the initial state, it changes to the F-state and the H-state according to the magnitude of the execution voltage applied to the transparent electrodes 34, 44. When the final state of the cholesteric liquid crystal 38 is the P-state and the F-state, these states are maintained even after the applied voltage is stopped. However, when the final state of the cholesteric liquid crystal 38 is the H-state, it is changed to the P-state. Accordingly, the P-state (light scattering state) or the F-state (light absorbing state) is selected as a final phase state according to the magnitude of the applied voltage regardless of exposure and non-exposure.

Specific examples of liquid crystals which may be used as the image recording layer 36 include the cholesteric liquid crystal 38, a nematic liquid crystal, and a smectic liquid crystal (as specific examples, Schiff base group, azo group, azoxy group, benzoate group, biphenyl group, terphenyl group, cyclohexyl carboxylic acid ester group, phenyl cyclohexane group, biphenyl cyclohexane group, pyrimidine group, dioxane group, cyclohexyl cyclohexane ester group, cyclohexylethane group, cyclohexane group, tolan group, alkenyl group, stilbene group, multiply fused ring system, and the like) and a liquid crystal obtained by adding chiral agent (as specific examples, steroid cholesterol derivative, Schiff base group, azo group, ester group, biphenyl group) to the mixture of the above substances.

The photoconductive layer 40 is a layer which has an internal photoelectric effect and characteristics by which impedance characteristics are changed according to the radiation intensity of the projector light 62. The photoconductive layer 40 more preferably has a three-layered structure in which not shown charge generation layers (CGL) are laminated on and under a not shown charge transport layer (CTL).

Examples of the photoconductive layer 40 include a layer including a compound semiconductor such as amorphous silicon, ZnSe, or CdS as an inorganic semiconductor material, a layer including anthracene, polyvinylcarbazole as an organic semiconductor material, and a so-called OPC (organic light conductor) layer including a mixture or a laminated body of a charge generation material for generating a charge movement by being irradiated with light and a charge transport material for generating a charge movement by an electric field.

The charge generation layer is a layer having a function of generating a photo carrier by absorbing the projector light 62. The charge generation layer laminated on the charge transport layer mainly determines the amount of photo carrier which flows in the direction of the transparent electrode 44 on the back surface side of the screen device 14 from the transparent electrode 34 on the surface side confronting the light collecting element array 20, and the charge generation layer laminated under the charge transport layer mainly determines the amount of photo carrier which flows in the direction of the transparent electrode 34 on the surface side confronting the light collecting element array 20 from the transparent electrode 44 on the back surface side of the screen device 14. Preferable example of the charge generation layer includes a charge generation layer which may generate an exciter by absorbing the projector light 62 and effectively separate a free carrier in the inside of the charge generation layer or on the interface of the charge generation layer and the charge transport layer.

The charge transport layer is a layer having such a function that when the photo carrier generated in the charge generation layers is injected thereinto, it drifts the photo carrier in the direction of an applied electric field. In general, since the charge transport layer has a thickness several tens of times larger than that of the charge generation layer, the capacity of the charge transport layer, the dark current of the charge transport layer, and the photo carrier current in the charge transport layer determines the contrast impedance of the overall photoconductive layer 40. The charge transport layer is more preferably a charge transport layer to which the free carrier is more effectively injected from the charge generation layers (it is preferable that the charge generation layers are near to an ionization potential) and in which the injected free carrier performs a hopping movement as fast as possible. To increase impedance in darkness, a dark current due to a heat carrier is preferably as low as possible.

The light absorbing layer 42 is a layer for absorbing the external light 72 irradiated from the lighting device 70.

The light absorbing layer 42 is specifically formed by a dry method, a wet coating method, and the like. In the dry method, an inorganic pigment (as specific examples, cadmium group, chromium group, cobalt group, manganese group, carbon group, and the like), or organic dye and an organic pigment (as specific examples, azo group, anthraquinone group, indigo group, triphenyl methane group, nitro group, phthalocyanine group, perylene group, pyrrolo pyrrole group, quinacridone group, polycyclic quinone group, squarylium group, azlenium group, cyanine group, pyrylium group, anthrone group, and the like) are directly formed to a film. In the wet coating method, these substances are dispersed to or dissolved in an appropriate solvent together with a polymer binder (as specific examples, polyvinyl alcohol resin, polyacryl resin, and the like) to thereby prepare a coating solution, and a film is formed by coating and drying the coating solution.

The drive unit 47 includes a power supply 48 and a switch 49. The power supply 48 applies a voltage to the transparent electrodes 34, 44 by turning on and off the switch 49. The switch 49 may be turned on and off by a user or may be controlled in conformity with the operation of the projector 12 for projecting an entirely white screen (the detail of which will be described later).

Although the interval (distance) between the light collecting element array 20 and the back surface sheet 30 is different depending on the degree of light collection (focal length) of the light collecting elements 22, the pitch of the pixels of the projector 12, and the like, it is preferably set to about 2 to 3 mm as a specific example.

Figure 5:
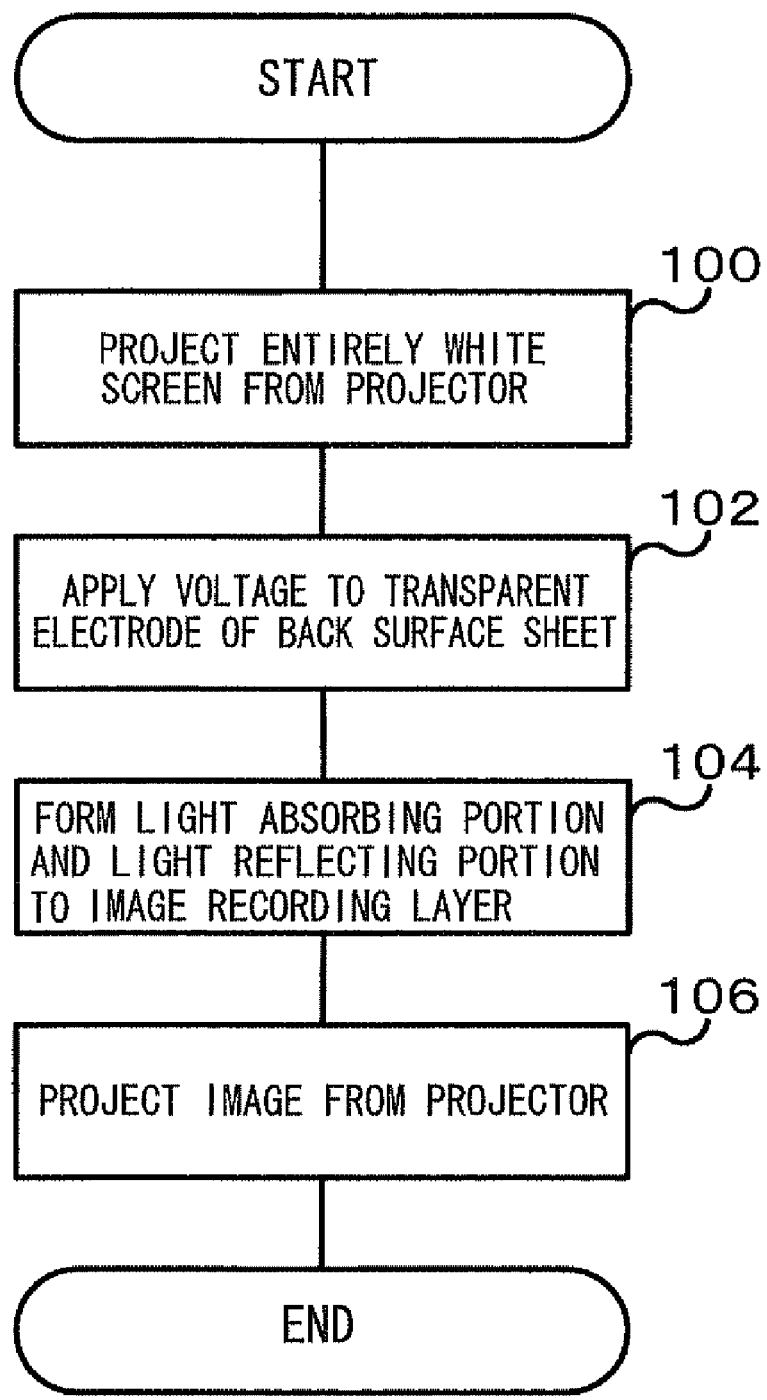
FIG. 5 is a flowchart showing an example of an image projection method according to the first exemplary embodiment of the invention.

Next, a method of projecting an image by the image projection system 10 of the first exemplary embodiment will be explained in detail. FIG. 5 is a flowchart showing an example of the image projection method according to the first exemplary embodiment. The flowchart shown in FIG. 5 is executed after the projector 12 and the screen device 14 are set in an environment in which they are used.

In step 100, an entirely white screen (overall white image) is projected onto the screen device 14 from the projector 12. The projection is preferably performed such that the external light 72 is not irradiated onto the screen device 14 by turning off the lighting device 70.

In next step 102, the switch 49 is turned on and a voltage is applied to the transparent electrodes 34, 44 of the back surface sheet 30 of the screen device 14 from the power supply 48.

In next step 102, the light absorbing portion 50 and the light reflecting portion 52 are formed to the image recording layer 36 of the back surface sheet 30 of the screen device 14 by the radiation of the entirely white screen by the projector 12 and the application of the voltage by the power supply 48.

Figure 6:
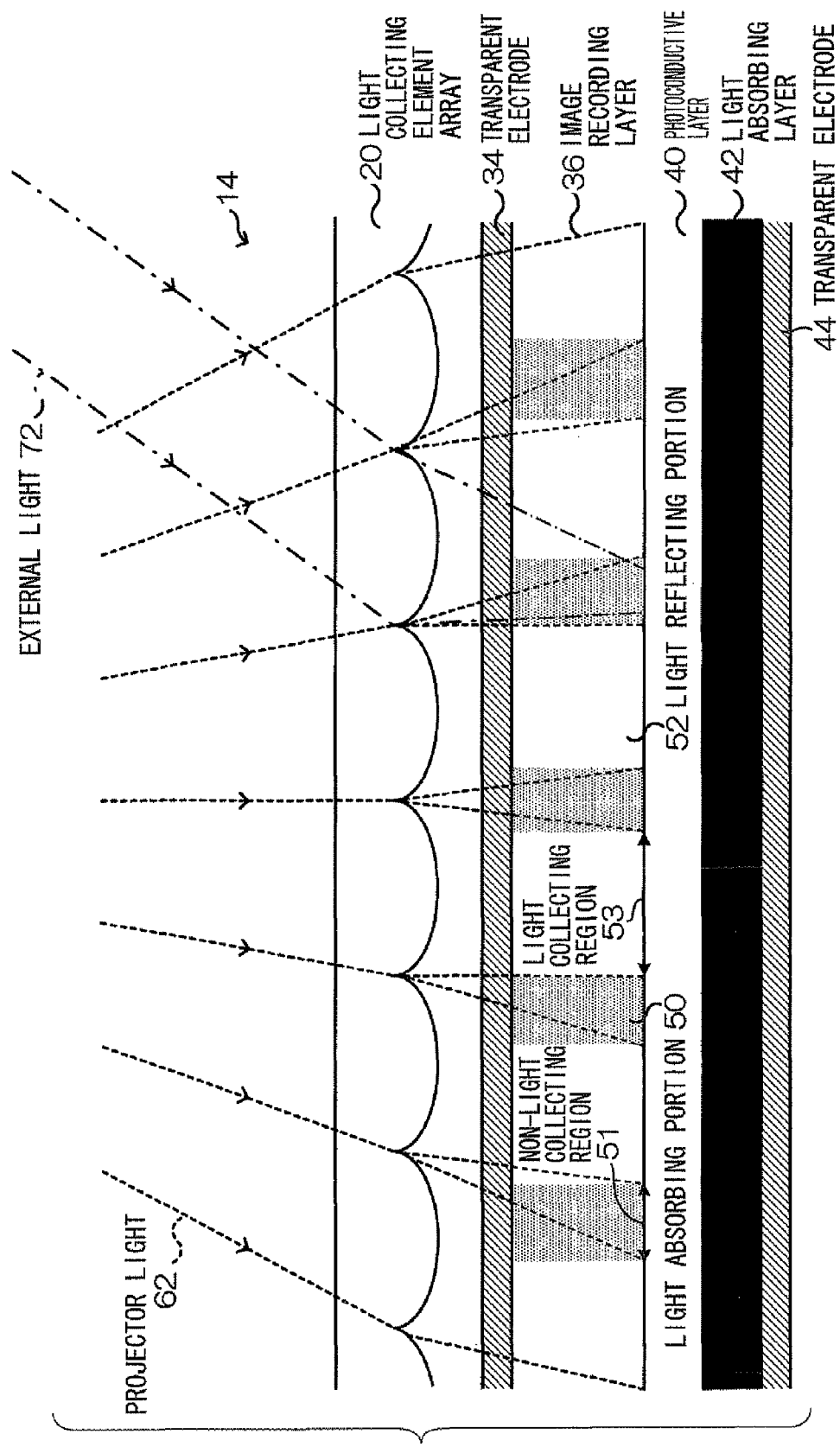
FIG. 6 is an explanatory view explaining formations and operations of a light absorbing portion and a light reflecting portion in the back surface sheet of the screen device according to the first exemplary embodiment of the invention.

The formation of the light absorbing portion 50 and the light reflecting portion 52 will be explained here in detail. As shown in FIG. 6, the projector light 62 of the entirely white screen irradiated form the projector 12 is collected by the respective light collecting elements 22 of the light collecting element array 20 and irradiated onto the back surface sheet 30. The light reflecting portion 52 is formed according to the light collecting region to which the collected projector light 62 is irradiated. In the light collecting region 53 of the photoconductive layer 40 to which the collected projector light 62 is irradiated, since a resistance value is reduced and the execution voltage applied to the image recording layer 36 is increased, the cholesteric liquid crystal 38 is made to enter the P-state (the light scattering state). In contrast, in a non-light collecting region 51 of the photoconductive layer 40 to which the collected projector light 62 is not irradiated, since the resistance value of the photoconductive layer 40 is increased and the execution voltage applied to the image recording layer 36 is reduced, the cholesteric liquid crystal 38 is made to enter the F-state (the light absorbing state).

The thus formed light absorbing portion 50 and light reflecting portion 52 are maintained even after the application of the voltage by the power supply 48 is stopped. It is preferable that the switch 49 is turned off and the application of the voltage is stopped after the light absorbing portion 50 and the light reflecting portion 52 are formed.

Following a state in which the lighting device 70 is turned off so that the external light 72 is not irradiated, after the light absorbing portion 50 and the light reflecting portion 52 are formed, the lighting device 70 is subsequently turned on according to a state of use of the projection system 10.

In step 106, an image is projected from the projector 12 onto the screen device 14 at which the light absorbing portion 50 and the light reflecting portion 52 are formed.

At this time, although the projector light (image light) 62 which is incident from the projector 12, and the external light 72 which is incident from the lighting device 70, are irradiated onto the screen device 14, the external light 72 is absorbed by the light absorbing portion 50. More specifically, the external light 72 passes through the light absorbing portion 50 of the image recording layer 36 and is absorbed by the light absorbing layer 42.

Accordingly, since a black color is displayed with a greater intensity of blackness, the contrast of an image displayed on a surface of the screen device 14, which is reflected by the light reflecting portion 52, is increased.

When the relative positions of the projector 12, the screen device 14, and the lighting device 70 are changed, after the steps 100 and 102 are executed again and the light absorbing portion 50 and the light reflecting portion 52 are formed again as shown in step 104, an image is projected as shown in step 106.

When the relative positions of the projector 12, the screen device 14, and the lighting device 70 are changed, the positions and the sizes of the non-light collecting region 51 and the light collecting region 53 corresponding to one light collection element 22 (1 cycle) change. However, in the first exemplary embodiment, the light absorbing portion 50 and the light reflecting portion 52 are formed according to the non-light collecting region 51 and the light collecting region 53 whose positions and sizes are changed. Accordingly, even when the relative positions of the projector 12, the screen device 14, and the lighting device 70 are changed, since the light absorbing portion 50 and the light reflecting portion 52 are formed in conformity with the relationship between the changed positions, the contrast of an image projected after they are formed is increased at all times.

Figure 7:
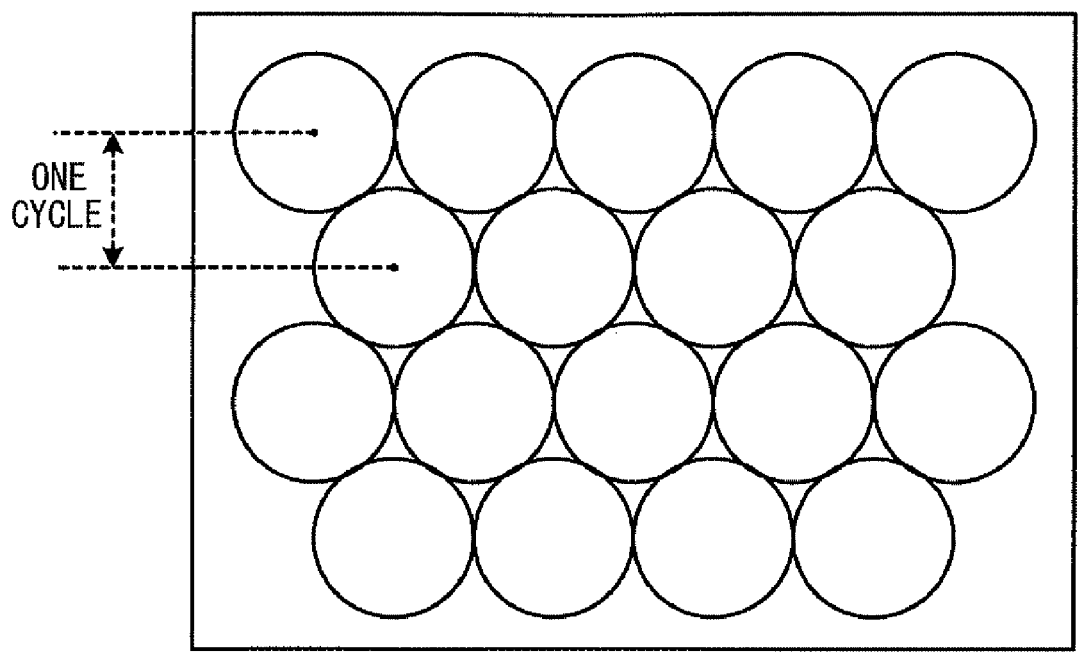
FIG. 7 is a schematic view showing an example of a schematic arrangement of another light collecting element array according to first exemplary embodiment of the invention.

Although the light collecting element array 20 includes the light collecting elements 22 that are the plano-convex cylindrical lenses in the first exemplary embodiment, it is not limited thereto and may include any lenses as long as they collect the light, which is irradiated to the screen device 14, onto the back surface sheet 30. For example, the light collecting element array 20 may include light collecting elements that are convex lenses as shown in FIG. 7. FIG. 7 shows a case that the light collecting element array is viewed from the direction of an arrow B shown in FIGS. 2A and 2B. Further, although not shown, the light collecting elements may include prisms.

Further, a Fresnel region and a prism region (any of which is not shown) may be disposed to the plane side of the light collecting element array 20 on which the projector light 62 is incident so that the light passing through the light collecting element array 20 is made to parallel light.

Figure 8:
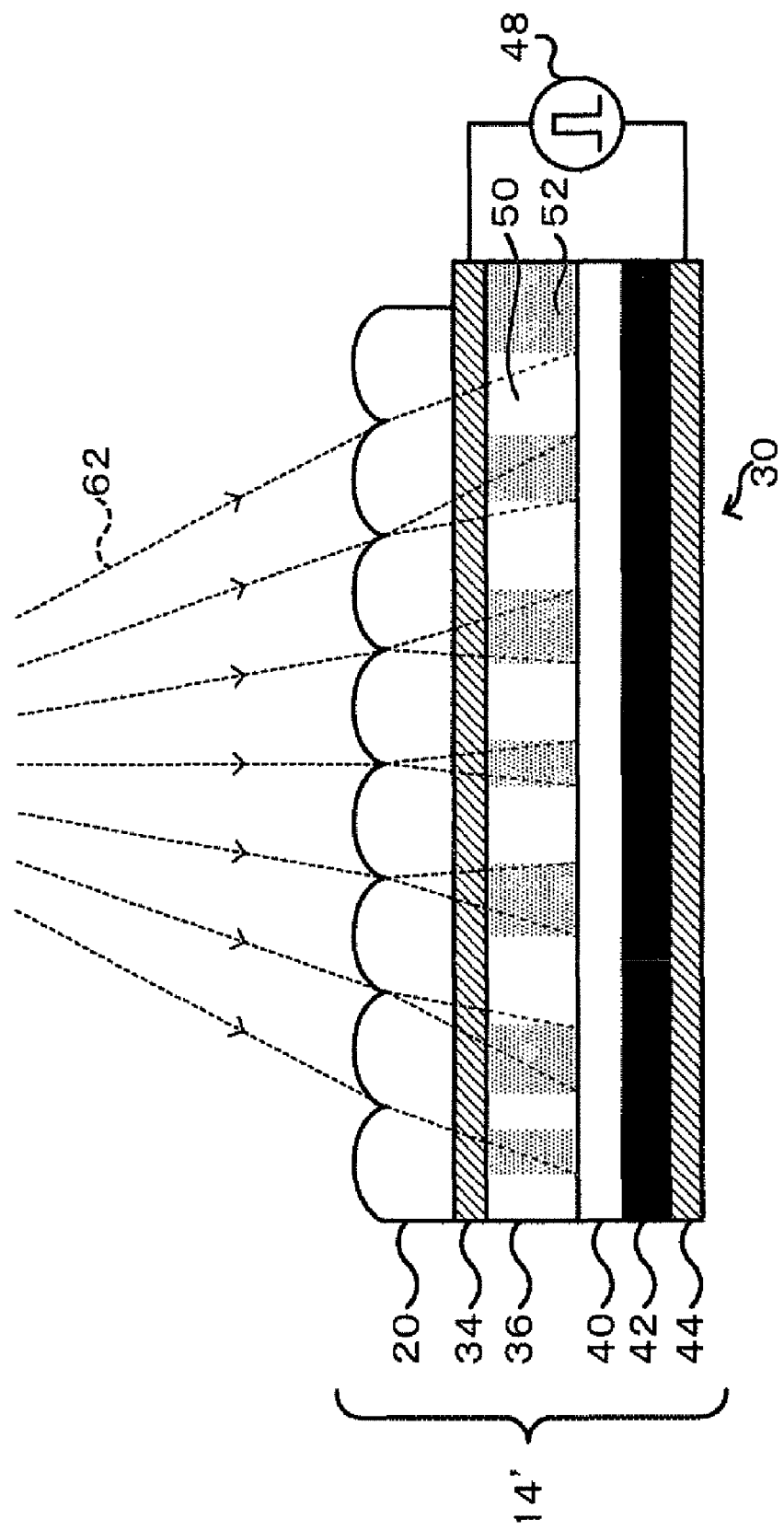
FIG. 8 shows an example of a schematic arrangement showing another relative position between the light collecting element array and the back surface sheet in the screen device according to the first exemplary embodiment of the invention.

Further, the relative position between the light collecting element array 20 and the back surface sheet 30 is not limited to that of the first exemplary embodiment. FIG. 8 shows an example of a schematic arrangement of another relative position between the light collecting element array 20 and the back surface sheet 30 in the screen device 14. In the screen device 14' shown in FIG. 8, the plane on the side of the light collecting element array 20, which confronts a light collecting surface 24, is disposed so that it confronts the transparent electrode 34 (transparent substrate 32) of the back surface sheet 30. When the light collecting element array 20 and the back surface sheet 30 are disposed as described above, they may be disposed without separating the light collecting element array 20 from the back surface sheet 30 as shown in FIG. 8.

As described above, in the first exemplary embodiment, the entirely white screen is projected onto the screen device 14 by the projector 12 in the state that the external light 72 is not irradiated by turning off the lighting device 70. The switch 49 of the screen device 14 is turned on, a voltage is applied to the transparent electrodes 34, 44 of the back surface sheet 30, the cholesteric liquid crystal 58 of the image recording layer 36 is changed, and the light reflecting portion 52 according to the light collecting region 53 to which the collected projector light is irradiated and the light absorbing portion 50 according to the non-light collecting region 51 to which the collected projector light is not irradiated are formed. After the light absorbing portion 50 and the light reflecting portion 52 are formed, the applied voltage is stopped, the lighting device 70 is turned on, and an image is projected from the projector 12.

With this operation, the external light 72 which is irradiated to the screen device 14 passes through the light absorbing portion 50 and is absorbed to the light absorbing layer 42. Accordingly, since the black color of a projected image is displayed with a greater intensity of blackness even in a bright environment of use in which the external light 72 exist, the contrast of the image displayed on the surface of the screen device 14 reflected by the light reflecting portion 52 is increased.

Further, even when the relative position among the projector 12, the screen device 14, and the lighting device 70 is changed, since the entirely white screen is projected again onto the screen device 14 by the projector 12 and the light absorbing portion 50 and the light reflecting portion 52 are formed, the contrast of the image displayed on the surface is more increased than a case in which the light absorbing portion 50 and the light reflecting portion 52 are fixed.

Second Exemplary Embodiment

A second exemplary embodiment will explain a specific example different from the first exemplary embodiment in which the back surface sheet includes the electronic paper in detail. Since the other arrangement of the second exemplary embodiment is approximately the same as that of the first exemplary embodiment, the explanation thereof is not repeated here.

Figure 9:
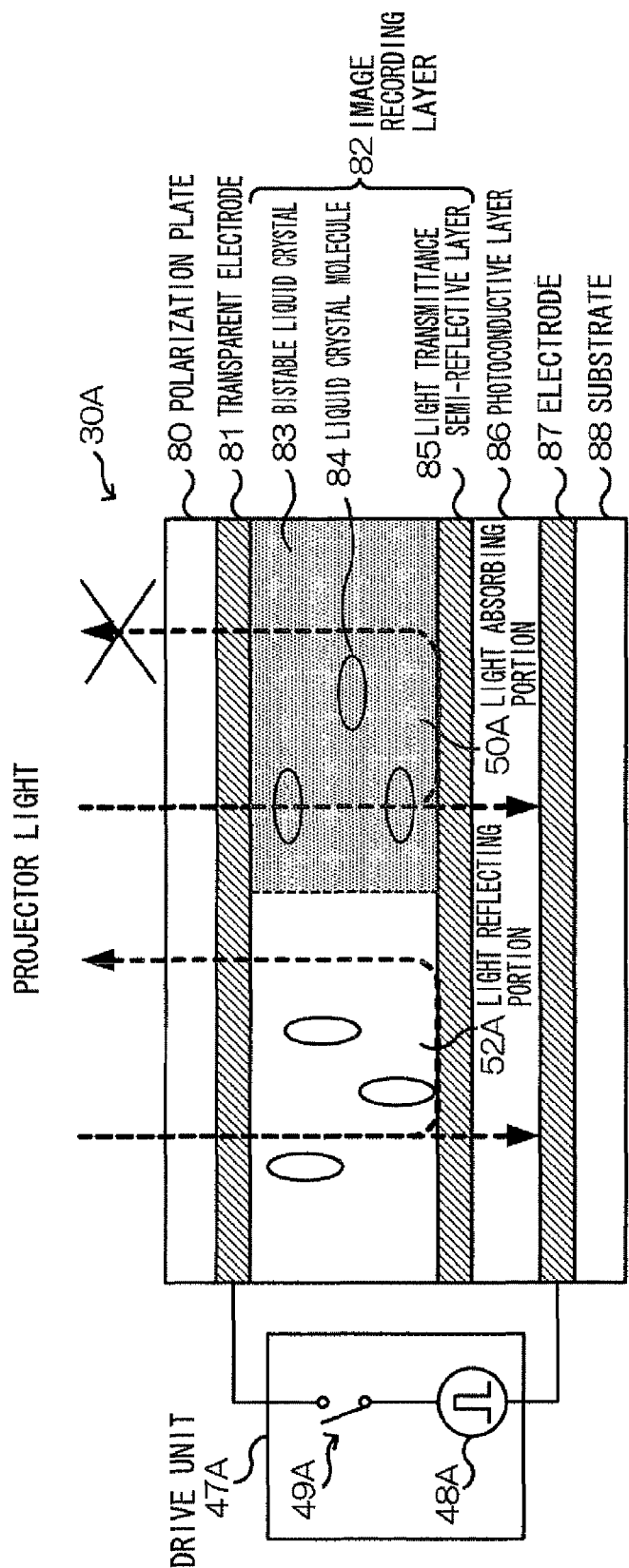
FIG. 9 is a schematic view showing an example of a schematic arrangement of a back surface sheet of a screen device according to a second exemplary embodiment of the invention.

FIG. 9 shows a schematic arrangement view of an example of a schematic arrangement of a back surface sheet 30A of the second exemplary embodiment. In the back surface sheet 30A of the second exemplary embodiment, an image recording layer 82 includes a bistable liquid crystal.

The back surface sheet 30A includes a polarization plate 80, a transparent electrode 81, the image recording layer 82, a photoconductive layer 86, an electrode 87, a substrate 88, and a drive unit 47A. The back surface sheet 30A includes the polarization plate 80, the transparent electrode 81, the image recording layer 82, the photoconductive layer 86, the electrode 87, and the substrate 88 which are sequentially laminated from a side confronting the light collecting element array 20.

A power supply 48A of the drive unit 47A of the second exemplary embodiment is an AC power supply.

The image recording layer 82 includes the bistable liquid crystal 83 including a liquid crystal molecule 84 and a light transmittance semi-reflective layer 85.

Specific examples of the bistable liquid crystal 83 include BiNem (registered trademark) mode, ZBD mode nematic liquid crystals, and a ferroelectric liquid crystal.

Projector light 62 is irradiated from the projector 12 as preparatory light polarized by the polarization plate 80 and is incident on the photoconductive layer 86 at a light collecting region, and a voltage is applied the photoconductive layer 86. When the voltage is applied, retardation ($\Delta n \cdot d$) becomes 0, the liquid crystal molecule 84 enters the state shown in FIG. 9, and a light reflecting portion 52A is formed.

In contrast, the voltage is not applied to a non-light collecting region to which the projector light 62 polarized by the polarization plate 80 is not irradiated. When the voltage is not applied, retardation ($\Delta n \cdot d$) becomes $\pi/4$, the liquid crystal molecule enters the state shown in FIG. 9, and a light absorbing portion 50A is formed.

Specific examples of the light transmittance semi-reflective layer 85 include a dielectric multilayer film mirror, and a reflective polarizer composed of a metal fiber.

As described above, in the back surface sheet 30A of the second exemplary embodiment, the light reflecting portion 52A is formed according to the light collecting region at which the light, which is obtained by collecting the projector light 62 as the preparatory light by the light collecting element array 20, is irradiated, and the light absorbing portion 50A is formed according to the non-light collecting region. As a result, the same operation/effect as that of the back surface sheet 30 of the first exemplary embodiment may be obtained by using the back surface sheet 30A as a back surface sheet of the screen device 10 similarly to the back surface sheet 30.

Third Exemplary Embodiment

A third exemplary embodiment will explain another specific example different from the first exemplary embodiment in which the back surface sheet includes the electronic paper and from the second exemplary embodiment in detail. Since the other arrangement of the third exemplary embodiment is approximately the same as that of the first exemplary embodiment, the explanation thereof is not repeated here.

Figure 10:
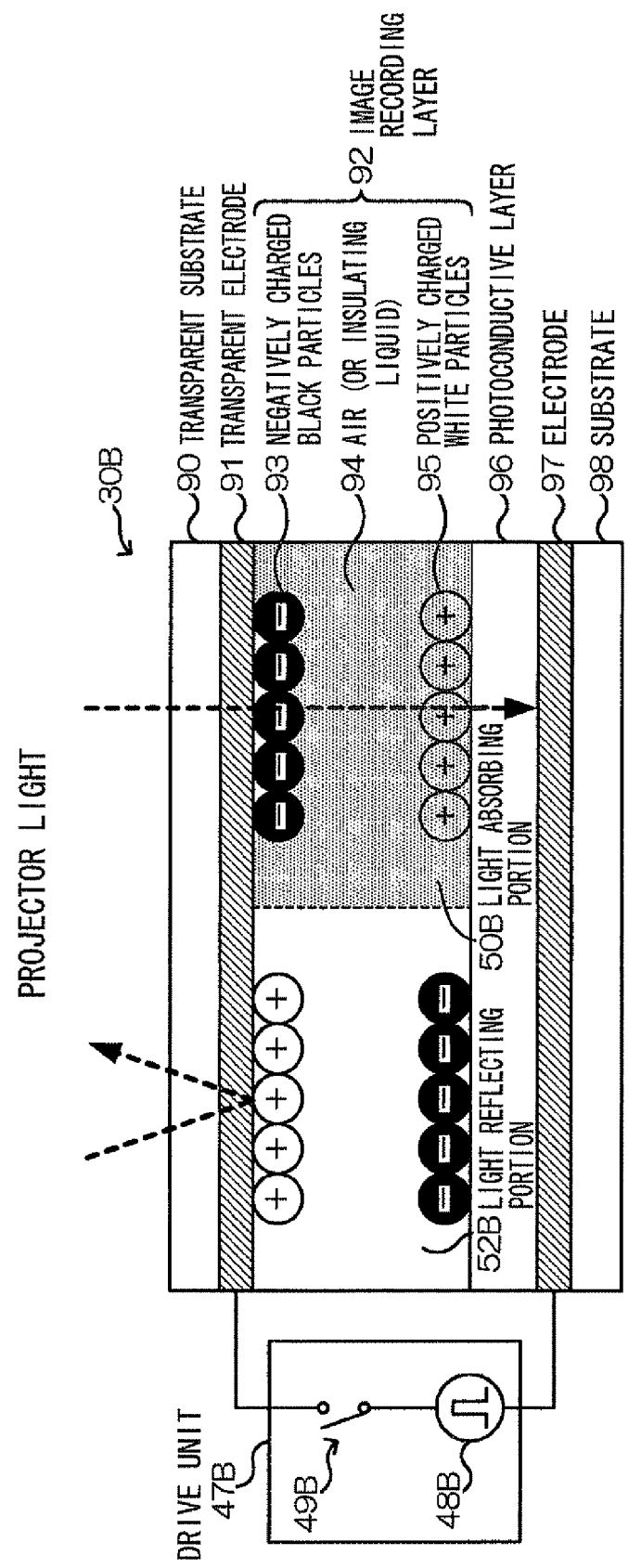
FIG. 10 is a schematic view showing an example of a schematic arrangement of a back surface sheet of a screen device according to a third exemplary embodiment of the invention.

FIG. 10 shows a schematic arrangement view of an example of a schematic arrangement of a back surface sheet 30B of the third exemplary embodiment. In the back surface sheet 30B of the third exemplary embodiment, an image recording layer 92 includes electrophoresis display elements.

The back surface sheet 30B includes a transparent substrate 90, a transparent electrode 91, an image recording layer 92, a photoconductive layer 96, an electrode 97, a substrate 98, and a drive unit 47B. The back surface sheet 30B includes the transparent substrate 90, the transparent electrode 91, the image recording layer 92, the photoconductive layer 96, the electrode 97, and the substrate 98 which are sequentially laminated from a side confronting the light collecting element array 20.

A power supply 48B of the drive unit 47B of the third exemplary embodiment is a DC power supply.

The image recording layer 92 is arranged such that the electrophoresis display elements that are negatively charged black particles 93 and positively charged white particles 95 are dispersed in air or in an insulating liquid 94.

First, a voltage is uniformly applied from the power supply 48B to establish a reset state in which the negatively charged black particles 93 are deposited on a side opposing the light collecting element array 20 and the positively charged white particles 95 are deposited on an opposite side thereto. Next, a voltage having an inverted polarity to the reset state voltage is applied from the power supply 48B, and projector light 62 as preparatory light is irradiated from the projector 12.

The positively charged white particles 95 are deposited at a light collecting region of the transparent electrode 91 and the negatively charged black particles 93 are deposited at a non-light collecting region thereof. In the third exemplary embodiment, the negatively charged black particles 93 allow light to pass therethrough such that the projector light 62 is incident on the photoconductive layer 96.

Since the positively charged white particles 95 are deposited at the light collecting region, a light reflecting portion 52B is formed, and since the negatively charged black particles 93 are deposited at the non-light collecting region, a light absorbing portion 50B is formed.

Figure 11:
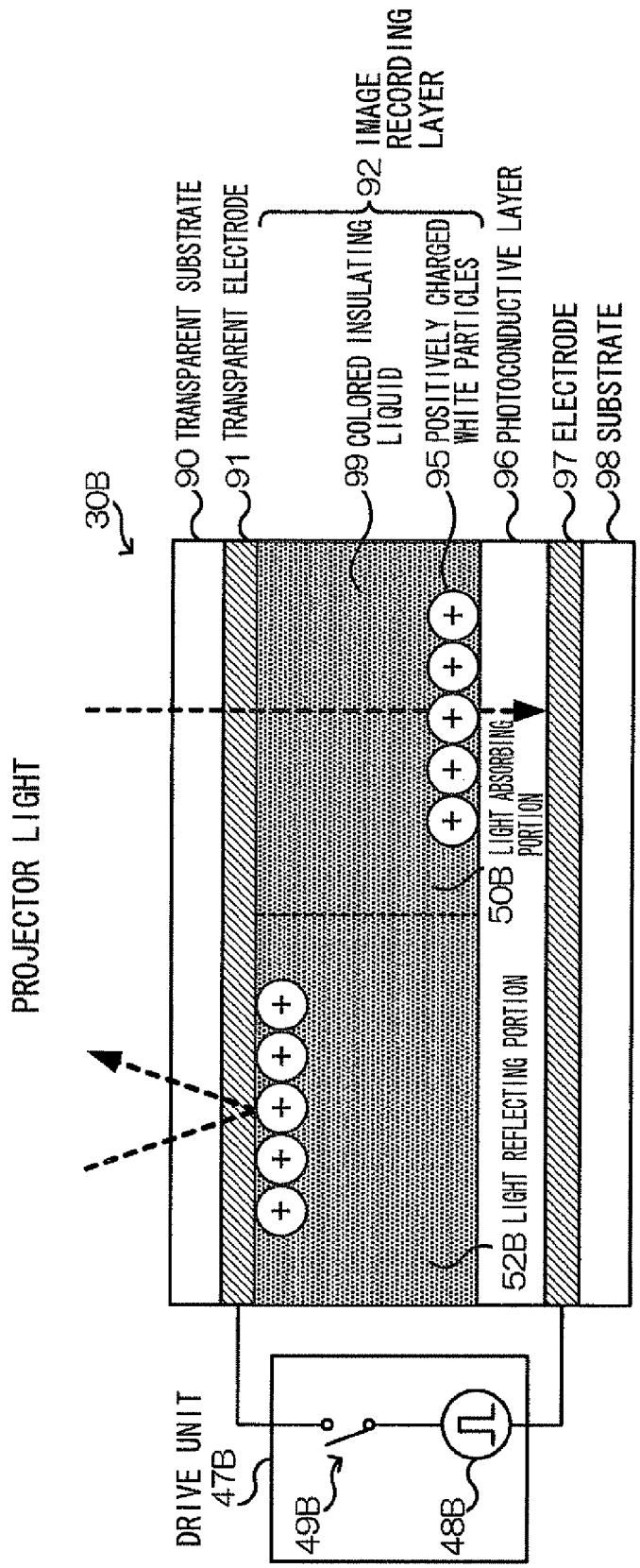
FIG. 11 is a schematic view showing another example of the schematic arrangement of the back surface sheet of the screen device according to the third exemplary embodiment of the invention.

As shown in FIG. 11, the image recording layer 92 may be arranged in such a manner that the positively charged white particles 95 are dispersed in a colored insulating liquid 99 without using the negatively charged black particles 93. Since the positively charged white particles 95 are deposited at the light collecting region, the light reflecting portion 52B is formed, and the light absorbing portion 50B is formed in the non-light collecting region by the colored insulating liquid 99 also in this case likewise.

As described above, in the back surface sheet 3013 of the third exemplary embodiment, the light reflecting portion 52B is formed according to the light collecting region at which the light, which is obtained by collecting the projector light 62 as the preparatory light by the light collecting element array 20, is irradiated, and the light absorbing portion 50B is formed according to the non-light collecting region. As a result, the same operation/effect as that of the back surface sheet 30 of the first exemplary embodiment may be obtained by using the back surface sheet 30B as a back surface sheet of the screen device 10 similarly to the back surface sheet 30.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A screen device comprising:
    a light collecting element array including a plurality of light collecting elements that collect incident light; and
    a back surface sheet which includes:
        a first electrode plate on which the incident light is incident,
        a second electrode plate,
        a photoconductive layer disposed between the first electrode plate and the second electrode plate and having impedance characteristics that change according to the light intensity of the incident light, and
        an image recording layer disposed between the first electrode plate and the photoconductive layer and having a layer state that changes based on a voltage applied to the first and second electrode plates and also based on the impedance characteristics of the photoconductive layer, and that maintains the layer state even after the application of the voltage is stopped, wherein
    the image recording layer includes a light reflecting portion being formed at a light collecting region to which the light collected by the light collecting elements is irradiated, and a light absorbing portion being formed at a non-light collecting region to which the light collected by the light collecting elements is not irradiated.

2. The screen device according to claim 1, wherein the image recording layer comprises at least one of a cholesteric liquid crystal, a nematic liquid crystal, and a smectic liquid crystal.

3. The screen device according to claim 1, wherein the light collecting element array comprises a plurality of plano-convex cylindrical lenses as the light collecting elements.

4. The screen device according to claim 3, wherein the incident light is incident from a plane of the light collecting element array, collected at a convex surface of the light collecting elements, and irradiated onto the back surface sheet.

5. The screen device according to claim 3, wherein the light collecting element array is disposed so that a plane of the light collecting element array confronts the back surface sheet.

6. The screen device according to claim 5, wherein the light collecting element array and the back surface sheet are disposed without being separated from each other.

7. The screen device according to claim 1, wherein the light collecting array comprises a plurality of convex lenses as the light collecting elements.

8. The screen device according to claim 1, wherein the image recording layer comprises a bistable liquid crystal comprising a liquid crystal molecule, and a light transmittance semi-reflective layer.

9. The screen device according to claim 1, wherein the image recording layer comprises negatively charged black particles and positively charged white particles dispersed in air or in an insulating liquid as electrophoresis display elements.

10. The screen device according to claim 1, wherein the image recording layer comprises positively charged white particles dispersed in a colored insulating liquid as electrophoresis display elements.

11. An image projection system comprising:
    the screen device according to claim 1; and
    a projector for projecting an image onto the screen device after light is irradiated onto an entire surface of the screen device.

12. An image projection method comprising:
    radiating the light from a projector to an entire surface of the screen device according to claim 1;
    collecting the light irradiated onto the entire surface of the screen device according to claim 1 by light collecting elements and forming a light reflecting portion at a light collecting region to which the light collected by the light collecting elements is irradiated, and also forming a light absorbing portion at a non-light collecting region to which the light collected by the light collecting elements is not irradiated, and projecting an image onto a screen device, at which the light reflecting portion and the light absorbing portion are formed, from the projector.

13. The image projection method according to claim 12, wherein radiating the light to the entire surface of the screen device from the projector is performed such that light other than the light from the projector is not irradiated to the screen device.

14. The image projection method according to claim 12, wherein forming the light reflecting portion and the light absorbing portion comprises applying a voltage to first and second electrode plates and stopping the application of the voltage after the light reflecting portion and the light absorbing portion are formed.

15. The screen device according to claim 1, wherein the light reflecting portion and the light absorbing portion are configured to be formed when the light collected by the light collecting elements is irradiated to the back surface sheet.

* * * * *